US012064683B2

(12) United States Patent
Dang

(10) Patent No.: US 12,064,683 B2
(45) Date of Patent: Aug. 20, 2024

(54) VIRTUAL CONSOLE GAMING CONTROLLER

(71) Applicant: GOOGLE LLC, Mountain View, CA (US)

(72) Inventor: Phi Hoai Dang, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/072,366

(22) Filed: Nov. 30, 2022

(65) Prior Publication Data
US 2023/0092439 A1 Mar. 23, 2023

Related U.S. Application Data

(62) Division of application No. 17/084,242, filed on Oct. 29, 2020, now Pat. No. 11,534,681.

(51) Int. Cl.
| | |
|---|---|
| A63F 13/22 | (2014.01) |
| A63F 13/2145 | (2014.01) |
| A63F 13/426 | (2014.01) |
| A63F 13/5255 | (2014.01) |
| A63F 13/837 | (2014.01) |
| A63F 13/92 | (2014.01) |
| G06F 3/04845 | (2022.01) |

(52) U.S. Cl.
CPC .......... *A63F 13/2145* (2014.09); *A63F 13/22* (2014.09); *A63F 13/426* (2014.09); *A63F 13/5255* (2014.09); *A63F 13/837* (2014.09); *A63F 13/92* (2014.09); *G06F 3/04845* (2013.01); *A63F 2300/1075* (2013.01); *A63F 2300/5553* (2013.01)

(58) Field of Classification Search
None
See application file for complete search history.

(56) References Cited

U.S. PATENT DOCUMENTS

| | | | |
|---|---|---|---|
| 2017/0282076 A1 | 10/2017 | Tsui et al. | |
| 2021/0220738 A1 | 7/2021 | Yang | |

FOREIGN PATENT DOCUMENTS

| | | |
|---|---|---|
| CA | 3132897 A1 | 10/2020 |
| WO | 2013138529 A1 | 9/2013 |
| WO | 2020151594 A1 | 7/2020 |

OTHER PUBLICATIONS

Player Unknown's Battlegrounds, Wikipedia, Wayback Machine, Dec. 20, 2018, https://web.archive.org/web/20181220060124/https://en.wikipedia.org/wiki/PUBG_Mobile, (Year: 2018).*

(Continued)

*Primary Examiner* — Damon J Pierce

(57) ABSTRACT

A system and method of displaying, on a touchscreen display of a mobile device, a virtual game controller having at least one virtual button configured to control multiple actions of an avatar representing a player within a video game executed by a remote gaming server. The player's interaction with the at least one virtual button is received through the touchscreen display and used to generate a control signal based on the received player interaction, the control signal being interpretable by the video game as an instruction to perform multiple actions in the video game. The control signal is transmitted from the mobile device for receipt by the remote gaming server executing the video game.

16 Claims, 7 Drawing Sheets

(56) References Cited

OTHER PUBLICATIONS

PUBG Mobile Controls Guide—Layout Differences, Customization, and Profiles, Josh Brown, Fanbyte, Jul. 9, 2019, https://www.fanbyte.com/guides/pubg-mobile-controls-guide-customization-profiles/ (Year: 2019).*

Map Control tips for Miramar! PUBG Mobile, PUBG Mobile, YouTube, May 20, 2018, https://www.youtube.com/watch?v=-HAsj9UcsCM (Year: 2018).*

Translation of Japanese Office Action mailed Aug. 8, 2023 for JP Application No. 2022/572411, 8 pages.

KNIVES OUT and PUBG information, in KNIVES OUT, 3 or 4 fingers are strong? Why not 2 fingers? How to do it and recommended settings, full text and diagram, [online], Aug. 4, 2020, [searched on Jul. 28, 2023], <URL:http://web.archive.org/web/20200804090647/https://pubg.v-ys.com/kouya-3hon4hon>.

Total strategy game, [KNIVES OUT] instant kill mode is rocking it! How to determine QS! [KNIVES OUT], full text and diagram, [online], Oct. 28, 2020, [searched on Jul. 28, 2023], <URL:https://web.archive.org/web/20201028104427/https://70okugame.com/knives-out/[KNIVES OUT] instant kill mode>.

International Preliminary Report on Patentability mailed May 11, 2023 for International Application No. PCT/US2021/029407, 8 pages.

Translation of Japanese Office Action mailed Dec. 12, 2023 for JP Application No. 2022-572411, 6 pages.

Communication pursuant to Rule 164(1) EPC mailed Feb. 21, 2024 for EP Application No. 21887085.5, 16 pages.

* cited by examiner

VIRTUAL CONSOLE GAMING CONTROLLER

CROSS-REFERENCE TO RELATED APPLICATIONS

The present application is a divisional application of U.S. patent application Ser. No. 17/084,242, entitled "VIRTUAL CONSOLE GAMING CONTROLLER" and filed on Oct. 29, 2020, the entirety of which is incorporated by reference herein.

BACKGROUND

The hardware required to display video game content and receive input from a player has evolved from running a physical hardcopy of the gaming software on a specialized computing device, or console, to a cloud-based service in which the gaming software executes on a remote server that is accessed by the player over the Internet. In cloud-based gaming, the resource-intensive aspects of the game, such as rendering of graphics, occurs at a server, rather than on a player's local device. Thus, mobile devices, such as cellular phones and tablets, which do not generally have as much computing power or memory as a console or desktop computer, can be used to play cloud-based video games without sacrificing image quality or overutilizing local processing resources. Thus, a player is no longer limited by the need to have specialized hardware to play a video game as video games can now be played on most any device with an Internet connection.

In video games, a first-person game is based on a graphical perspective rendered from the viewpoint of the player's avatar, or a viewpoint from the driver's seat or cockpit of a vehicle operated by the player's avatar. Games in which a player's objective is to shoot or otherwise battle enemies are known as first-person shooter (FPS) games. Many FPS games display the hands of a player's avatar and their selected weaponry in the main view, with a heads-up display to the side of the main view showing health, ammunition, location, and other details. A player moves their avatar within the game through the use of a combination of a keyboard and mouse or a physical game controller (e.g., a gamepad) with designated buttons and sticks to perform actions, such as running, sidestepping, looking, aiming, firing, etc. As some of these actions need to occur simultaneously, such as aiming and firing, a player controlling their avatar using a keyboard or mouse or a physical game controller is used to activate multiple buttons and/or sticks using multiple fingers at the same time.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
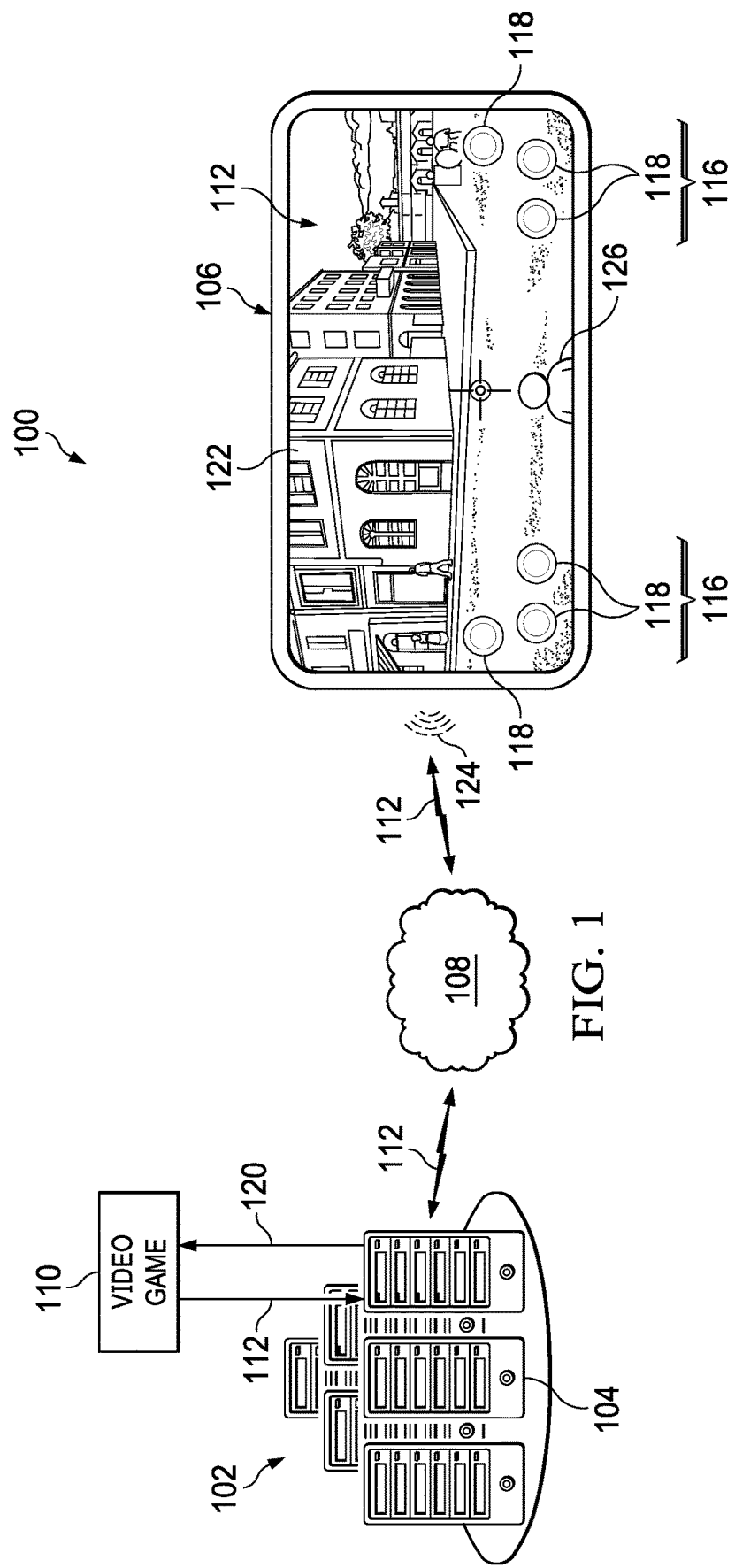
FIG. 1 is a block diagram of a cloud gaming system configured to facilitate user play of a video game on a remote client device via a virtual game controller displayed at a touchscreen display in accordance with some embodiments.

When a player plays a cloud-based video game on a mobile device, such as a mobile phone or tablet computer with a touchscreen display, the touchscreen display of the mobile device serves to both display the graphics of the game and to receive user input via touch in order to control the user's avatar. To provide a user with controls for manipulating their avatar, a virtual gamepad can be displayed overlaying the game itself. The virtual gamepad is configured with virtual buttons corresponding to the buttons and sticks of a physical gamepad controller, thus allowing the user to control their avatar by tapping or otherwise pressing the displayed virtual buttons in much the same manner as they would if the player were holding a physical gamepad controller. However, a user often only has their thumbs available for manipulating the virtual buttons of the virtual gamepad as their palms and fingers are already engaged to hold and secure the mobile device during play. This makes concurrently manipulating multiple virtual buttons impracticable, thus detracting from a user's experience while playing the video game.

FIGS. 1-7 illustrate a gaming system in which virtual buttons of a virtual game controller displayed at a mobile device are configured to control multiple actions of a player's avatar in the gameplay of a video game such that a player can effectively provide a wide range of player input using just their thumbs, or more generally just one or two touchpoints, via a touchscreen display of the mobile device. Further, in some embodiments, a virtual area of the virtual game controller is configured to allow a player to control the actions of their avatar within the video game as though the player was using a physical game controller with at least one stick controller.

In the context of an FPS video game, the virtual game controller includes a virtual button, typically displayed on the left side of the virtual controller, configured to both aim a weapon held by the player's avatar and to move the player's avatar within the scene of the game. The virtual controller also includes a virtual button, typically displayed on the right side of the virtual controller, configured to both adjust the avatar's view of the video game environment (i.e., the rendered landscape or cityscape in which the avatar is located within the video game) and to discharge or otherwise activate a weapon held by the player's avatar. An area within the same side of the virtual game controller as this button is configured to also adjust the direction of an avatar's gaze within the video game. Player input received at each of the buttons and at the specially-configured area is converted into one or more control signals that are interpreted by the video game as though the one or more control signals were provided to the video game by a physical game controller. That is, the virtual game controller displayed at a display of the mobile device, in conjunction with a player's manipulation of the virtual controller via a touchscreen of the mobile device, operates to emulate the operation of a physical game controller without requiring more than two concurrent touch inputs. Thus, the virtual game controller allows a player to play a video game on their mobile device using only their thumbs and without the need to concurrently manipulate multiple virtual buttons or areas on the same side of the virtual controller in order to control the actions of their avatar within the video game.

FIG. 1 illustrates a cloud gaming system 100 for cloud-based play of a video game 110 via a remote client device 106 employing a touchscreen-enabled virtual game controller in accordance with some embodiments. The cloud gaming system 100 includes a data center 102 having a gaming server 104 connected to a client device 106 via one or more packet-switched networks 108. The remote gaming server 104 operates to execute a video game software application 110 (hereinafter, "video game 110") that results in the real-time rendering of a sequence of video frames, which the gaming server 104 encodes and otherwise formats for inclusion in a video stream 112 transmitted to the client device 106. The client device 106 operates to receive the video stream 112, decode the encoded video frames contained therein, and display the decoded video frames in sequence to provide a video presentation of rendered graphical content to a player. Audio content is generated by the gaming server 104 through execution of the video game 110 and provided to the client device 106 for output to the player in a similar manner.

The client device 106 includes a network interface 124 connected to the network 108 to receive the video data and audio data transmitted from the gaming server 104 via the network 108, and compute, storage, and display resources (not shown) for decoding and displaying the video frames of the transmitted video stream 112 and for outputting the corresponding audio content. The client device 106 includes any of a variety of mobile or portable electronic devices held by a player while in operation, including a compute-enabled cellular phone (that is, a "smartphone") or a tablet computer, or otherwise being typically utilized by the player to render more than two concurrent touches on a touchscreen impracticable, such as in the case of a compute-enabled watch (that is, a "smart watch") or other wearable electronic device.

In some embodiments, the processing and display of video and audio content from the video game 110 executed at the gaming server 104 is facilitated by a software application executed at the client device 106. This software application can include, for example, a cloud-gaming-specific software application. In other embodiments, a more general software application is utilized, and the video stream 112 and audio stream (not shown) are formatted and transmitted by the gaming server 104 to be compatible with this software application. For example, in one embodiment the client device 106 utilizes a web browser that utilizes a hypertext markup language (HTML) format for display of the video content represented by the video stream 112 and output of the audio content represented by the associated audio stream, and the gaming server 104 provides the video stream 112 in a format, such as .mp4 or .MOV, compatible with the HTML format for display via the web browser.

Being interactive, the video game 110 utilizes player input to at least partially direct the gameplay experience of a gaming session with the player. Player input is received, at least in part, through a virtual game controller 116 displayed at a touchscreen display 122 of the client device 106. The touchscreen display 122 includes an electronic visual display, for presenting rendered content to a player, coupled to a touchscreen panel composed of sensors to detect pressure, changes in capacitance, or interruptions in light beams resulting from a player's contact with the screen, either directly or through use of a stylus or other implement. The virtual game controller 116 includes one or more player-manipulable components 118 that, in response to being manipulated by the player via the touchscreen display 122 of the client device 106, result in a processing component of the virtual game controller 116, or otherwise associated with the virtual game controller 116, generating a corresponding player feedback data and providing that player feedback data for transmission to the gaming server 104 via the packet-switched network 108 as part of a player input stream 120. The player-manipulable components 118 typically are displayed as overlaying displayed graphical content represented in the transmitted video stream 112. The virtual game controller 116 is generally configured to emulate a physical gamepad controller, as further described below with reference to FIG. 4.

For ease of reference, the player-manipulable components 118 are generally referred to herein as "virtual buttons 118" or more generally "buttons 118" and "pressing" a button or "press" of a button will be understood to be the player's touch or other contact interaction with the touchscreen display 122 in an area associated with a location of a player-manipulable component 118 on the touchscreen display 122 in a manner that results in the client device 106 interpreting the touch interaction as a specified player interaction with the virtual game controller 116 and thus generating and transmitting at least one corresponding control signal.

At least some of the virtual buttons 118 of the virtual game controller 116 are configured to control multiple actions of a player's avatar 126 in the gameplay of a video game, which is common in the context of FPS video games where, for example, a player may need to aim and shoot concurrently. The virtual game controller 116 allows a player to provide a wide range of player input through the use of just one or two touchpoints, which facilitates gameplay of a video game on a mobile device where the player typically only has two thumbs available to provide player input. Thus, the virtual controller allows a player to play a video game on their mobile device using only their thumbs and without the need to concurrently manipulate multiple virtual buttons or areas on the same side of the virtual controller in order to control the actions of their avatar within the video game.

Figure 2:
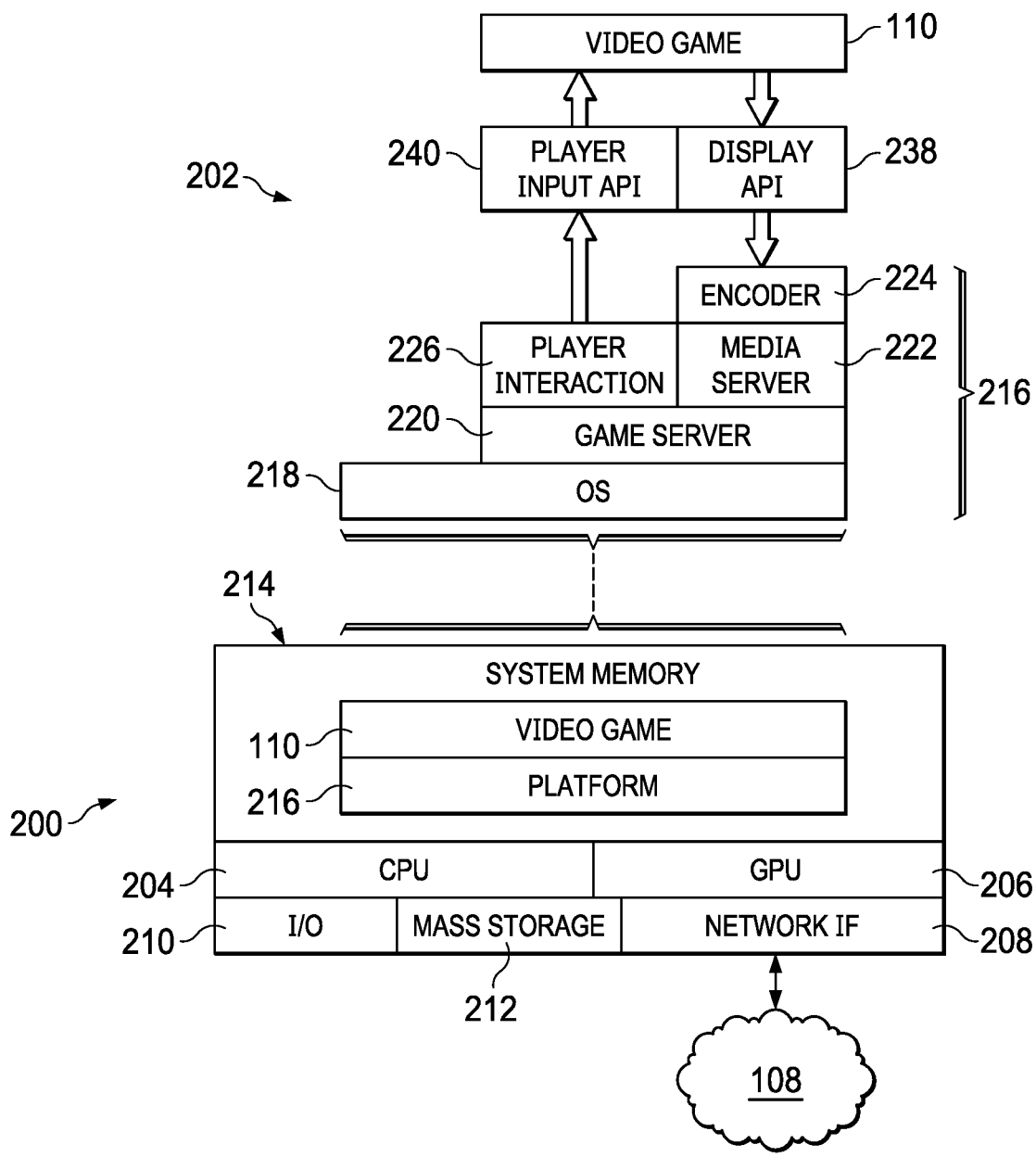
FIG. 2 is a block diagram illustrating an example hardware and software configuration of a client device in accordance with some embodiments.

FIG. 2 illustrates a general hardware configuration 200 and software configuration 202 of the gaming server 104 of FIG. 1. As depicted by the hardware configuration 200, the gaming server 104 includes one or more processors, such as one or more central processing units (CPUs) 204, one or more graphics processing units (GPUs 206), one or more application-specific integrated circuits (ASICs)(not shown), and the like. The hardware configuration 200 further includes a network interface 208 coupled to the network 108, one or more input/output (I/O) devices 210, (such as a keyboard, mouse, or display), one or more mass storage devices 212 (such as a hard drive, optical disc drive, or network-attached storage), and the like. The hardware configuration 200 further includes at least one random access memory (RAM) or other system memory 214 accessible by the one or more processors. The system memory 214 stores one or more software applications that include program code representing executable instructions that manipulate the one or more processors to perform various operations described herein. These software applications include the aforementioned video game 110 as well as a set of one or more software applications collectively referred to as platform software 216.

The platform software 216 operates to facilitate execution of the video game 110 at the gaming server 104. In some implementations, the game developer of the video game 110 specifically configures the video game 110 for execution by a gaming server, in which case the platform software 216 provides application programming interfaces (APIs) and other "hooks" that provide a more transparent interaction between the hardware configuration 200 and the video game 110. In other embodiments, the video game 110 is developed for a specific local hardware platform, such as a personal computer (PC) platform or a game console platform, in which case the platform software 216 emulates the typical interfaces between the video game 110 and its expected local hardware platform, and thus renders the actual underlying hardware configuration 200 of the gaming server 104 less transparent to the video game 110. An example configuration of the platform software 216 and its interaction with the video game 110 are illustrated by the software configuration 202.

In the depicted software configuration 202, the platform software 216 includes an operating system (OS) 218, a gaming server module 220, a media server module 222, an encoder module 224, a player interactivity module 226, as well as other various modules for supporting cloud gaming executing as known in the art. The OS 218 operates to manage the overall operation of the gaming server 104 and to act as an interface between the hardware components and the higher-level software layers. The gaming server module 220 operates to provide server-side functionalities associated with the video game 110, such as setting up game sessions, storing session state data and other game-related data, processing gameplay inputs, and rendering gameplay outputs in response to the gameplay inputs. The media server module 222 operates to host a media streaming site, receive concurrent ancillary or supplemental media streams associated with an online gaming session, and provide the concurrent media streams (e.g., video stream 112, FIG. 1) to the client device 106 for concurrent display with a gaming session that is being supported during execution of the video game 110. The encoder module 224 operates to encode the media streams for transmission to the client device 106. Although illustrated as a software module executed by the processor resources of the gaming server 104, in other embodiments the encoder module 224 can be implemented in whole or in part as a hardcoded or programmable logic integrated circuit, such as an ASIC.

The player interactivity module 226 operates to extract player input data in the player input stream 120 and present the player input data as player inputs to the video game 110 in an appropriate format. To illustrate, in implementations in which the platform software 216 emulates a PC, game console, or other local gaming environment, the player interactivity module 226 can operate to emulate inputs to one or more instances of the video game 110 as though the inputs were player inputs coming from a physical game controller for each instance, rather than the virtual game controller 116 remote to the gaming server 104 and connected via the network 108.

Figure 3:
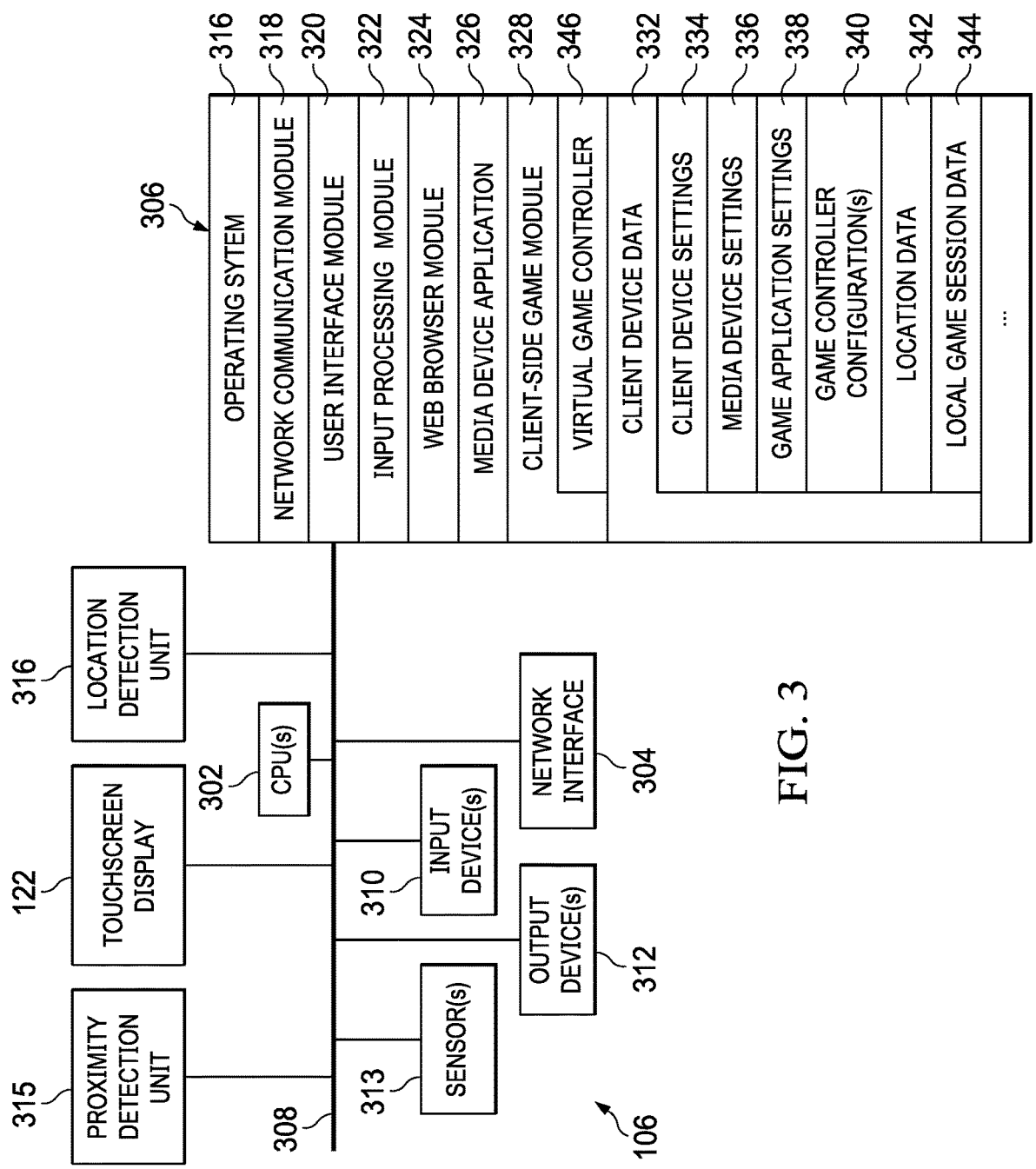
FIG. 3 is a block diagram illustrating another example hardware and software configuration of a client device in accordance with some embodiments.

FIG. 3 is a block diagram illustrating an example implementation of the client device 106 in accordance with some embodiments. The client device 106 includes one or more processing units (CPUs) 302, one or more network interfaces 304, memory 306, and one or more communication buses 308 for interconnecting these components (sometimes called a chipset). The client device 106 includes one or more input devices 310 that facilitate player input, such as a keyboard, a voice-command input unit, a touch-sensitive input pad, a gesture capturing camera, or other input buttons or controls. The client device 106 also includes one or more output devices 312 that enable presentation of user interfaces and display content, including one or more speakers and/or one or more visual displays. The client device 106 also includes a touchscreen display 122, which is configured to both display content to a player and receive input from the player at an interface.

In some embodiments, the client device 106 further includes a location detection device 314, such as a GPS (global positioning satellite) receiver or other geo-location receiver, for determining the location of the client device 106. The client device 106 may also include a proximity detection device 315, e.g., an infrared (IR) sensor, for determining a proximity of other client devices. The client device 106 may also include one or more sensors 313 (e.g., accelerometer, gyroscope, etc.) for sensing motion, orientation, and other parameters of the client device 106, which may be used as input.

Memory 306 includes random-access memory and further may include non-volatile memory, such as one or more magnetic disk storage devices, one or more optical disk storage devices, one or more flash memory devices, or one or more other non-volatile solid-state storage devices. The memory 306 stores a variety of programs, modules, and data structures, or a subset or superset thereof. Example programs stored at the memory 306 include an operating system 316, including procedures for handling various basic system services and for performing hardware dependent tasks, a network communication module 318 for connecting the client device 106 to other devices (e.g., the gaming server 104 or other client devices) via one or more network interfaces 304 (wired or wireless) and one or more networks 108, such as the Internet, other wide area networks, local area networks, metropolitan area networks, etc.

In some embodiments, the memory stores a user interface module 320 for enabling presentation of information (e.g., a graphical user interface for presenting applications, widgets, video game content, etc.) at the client device 106 via one or more output devices 312 (e.g., touchscreen display 122). The user interface module 320 includes an input processing module 322 for detecting one or more player inputs or interactions from one of the one or more input devices 310 and interpreting the detected input or interaction. In some embodiments, the memory 306 stores a client-side game module 328 for providing client-side functionalities associated with one or more gaming titles, including but not limited to displaying a virtual game controller, such as virtual game controller 116, setting up game sessions, locally storing session state data and other game-related data, receiving gameplay inputs from the input device 310 and/or the touchscreen display 122, and providing gameplay outputs in response to the gameplay inputs, where, in some implementations, the client-side game module 328 is configured to provide gameplay outputs to a remote server 104 implementing video game 110.

In some embodiments, the memory 306 stores client device settings 334 for storing information associated with the client device 106 itself, including common device settings (e.g., service tier, device model, storage capacity, processing capabilities, communication capabilities, etc.). Client device settings include game application(s) settings 338 for storing information associated with player accounts of the game application(s), including one or more of account access information, in-game player preferences, gameplay history data, and information on other players, game controller configuration(s) 340 for storing information associated with configurations of client-side game module 328 for game application(s) 328, local game session data 344 including information associated with online gaming sessions that are executed on the client device 106 in association with different gaming titles, e.g., latest status information, texture pages, vertex pages, constant pages, and frame data of one or more image frames associated with each of the online gaming sessions.

Each of the above-identified elements may be stored in one or more of the previously mentioned memory devices and corresponds to a set of instructions for performing a function described above. The above-identified modules or programs (i.e., sets of instructions) need not be implemented as separate software programs, procedures, modules, or data structures, and thus various subsets of these modules may be combined or otherwise re-arranged in various implementations. In some implementations, memory 306 stores a subset of the modules and data structures identified above. Furthermore, memory 306 may store additional modules and data structures not described above.

Figure 4:
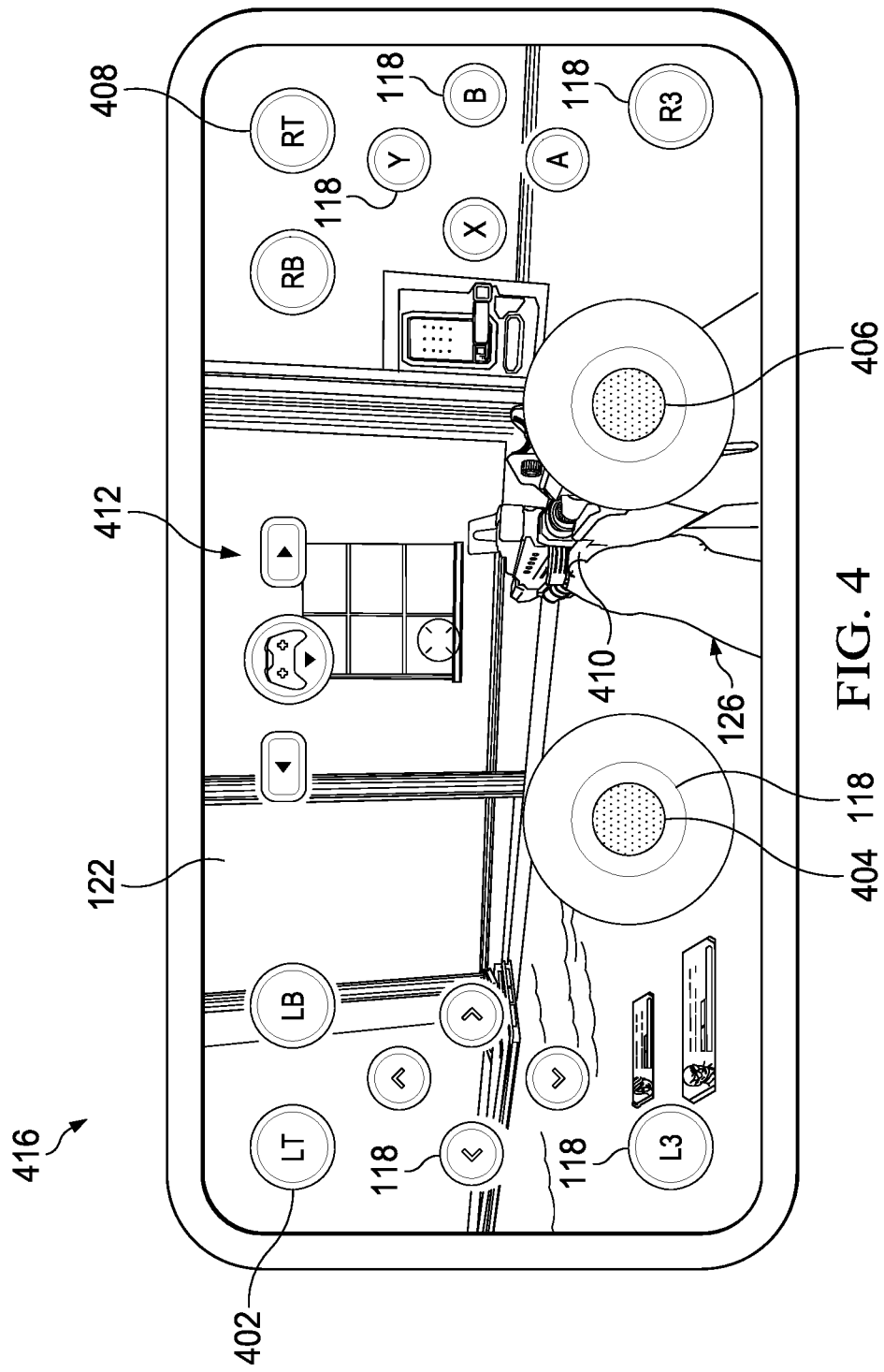
FIG. 4 is a diagram illustrating a configuration of a virtual controller to control a video game from a client device in accordance with some embodiments.

FIG. 4 illustrates an example configuration of a virtual game controller 416 (one embodiment of the virtual game controller 116) to receive player input for the control of a video game, such as video game 110. The virtual game controller 416 is configured to display virtual buttons 118 on either or both of the right and left sides of a touchscreen display 122 of a client device 106 such that a player can manipulate the virtual buttons with their thumbs and fingers as they hold the device. The virtual buttons 118 are configured to "receive" player input (via the touchscreen display 122) in order to manipulate a player's avatar 126 and objects within their avatar's control in the video game 110 as though the player were using a physical game controller to provide player input to the video game 110. While numerous virtual buttons 118, and combinations thereof, can be implemented by the virtual game controller 416 and configured to receive player input in order to control various aspects of the video game 110 and the player's gaming experience, for ease of description, only some of the virtual buttons 118 and their functions are described in detail below and the functions and operations of other buttons 118 will be readily understood based on the following descriptions.

In the context of a first-person shooter (FPS) video game, a left trigger button 402 is used for aiming down sight (ADS) of a weapon 410 or object held by the player's avatar 126. A left stick button 404 is configured to move the player's avatar 126 within the video game 110. A right stick button 406 is configured to pan the point of view 412 of a player's avatar 126 within the video game 110 and a right trigger button 408 is configured to activate an object or fire a weapon 410 in the avatar's 126 control within the video game 110. In a physical game controller, the right stick provides velocity-based feedback to the video game 110 such that the farther the stick is moved away from its original centered position, the farther and faster the avatar's view 412 of the video game 110 environment is changed. The right stick button 406 of the virtual game controller 116 is configured to emulate the velocity-based functioning of a right stick on a physical gamepad by adjusting an avatar's view 412 based on how far from its original position the right stick button 406 is dragged by a player. This results in relatively small movements of the right stick button 406 being translated into large changes in the avatar's view 412, thus making precise movement of the avatar's view difficult.

With the described configuration, a player generally needs to manipulate certain combinations of the virtual buttons 118 concurrently in order to accomplish certain movements and actions of the avatar 126. For example, in order to locate and aim at targets within the video game 110, a player typically needs to hold the left trigger button 402 to aim down sight with the weapon 410 held by their avatar 126 while concurrently manipulating the direction their avatar 126 is moving by manipulating the left stick button 404. It is also common, for example, that in order to change the view 412 of an avatar while firing a weapon 410, a player needs to concurrently manipulate the right stick button 406 and the right trigger button 408. However, when holding a device, a player generally only has their thumbs available to manipulate the virtual buttons 118, making concurrent control of multiple virtual buttons 118 difficult.

Figure 5:
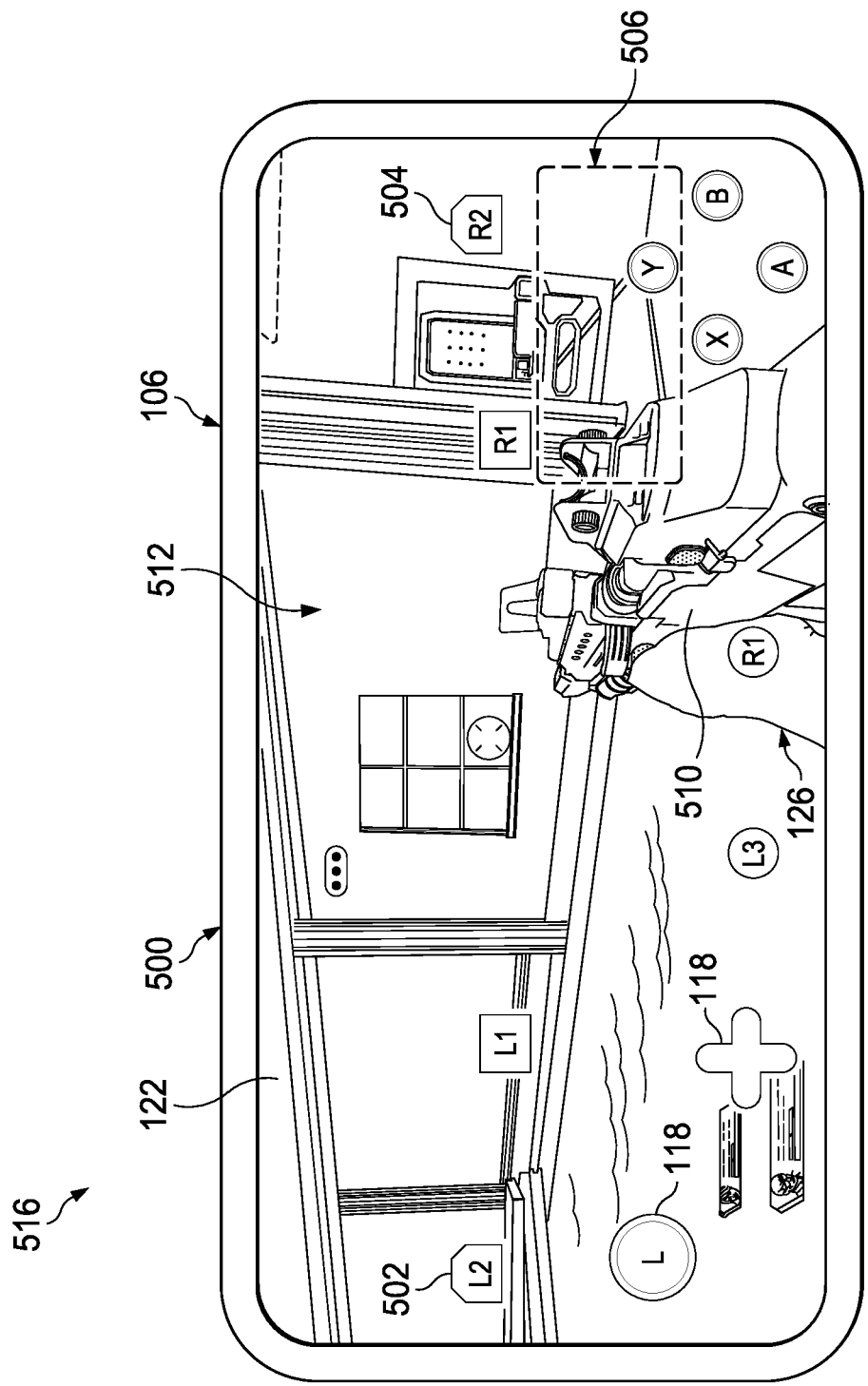
FIG. 5 is a diagram illustrating another configuration of a virtual controller to be displayed on a client device in accordance with some embodiments.

FIG. 5 illustrates an example configuration of a virtual controller 516 (another embodiment of virtual game controller 116) of the client device 106 in accordance with some embodiments. The virtual controller 516 is configured to display virtual buttons 118 on both the right and left sides of a touchscreen 122 of the client device 106 such that a player can manipulate the buttons with only their thumbs as they hold the device. In an embodiment, a draggable aim-and-move button 502 is provided and displayed on the left side of the touchscreen so as to be manipulable by a player's left thumb. The aim-and-move button 502 is configured to be draggable within an area of the touchscreen 122. Dragging of the aim-and-move button 502 by the player results in movement of the player's avatar 126 within the video game 110 at the same time the player's avatar 126 is aiming an object 510 within their control. Thus, the aim-and-move button 502 is a combination of the functionalities of the left trigger button 402 and the left stick button 404 of the virtual game controller 416 illustrated in FIG. 4. While the aim-and-move button 502 is depicted and described as being positioned on the left side of a touchscreen 122 of a client device 106, the layout of the buttons of the virtual controller 516 are configurable by the player to be displayed at any location on the touchscreen 122.

In an embodiment, a draggable point-and-shoot button 504 is provided and displayed on the right side of the touchscreen 122 of the client device 106. The point-and-shoot button 504 is configured to be draggable within an area of the touchscreen 122. The point-and-shoot button 504 is also configured to activate an object 510 held by the player's avatar 126, such as a rifle, upon initial contact with the button 504 by the player and for as long as the player holds the point-and-shoot button 504. The point-and-shoot button 504 is further configured to adjust the direction in which the player's avatar is looking in response to the player dragging the point-and-shoot button 504 within the area of the touchscreen 122. Thus, a player can both direct the gaze of their avatar 126 while shooting, or otherwise activating an object in the avatar's control, by holding and dragging the point-and-shoot button 504 within the area of the touchscreen 122. The point-and-shoot button 504 of the virtual controller 516 essentially combines the functionalities of the right trigger button 408 and right stick button 406 of the virtual controller 416 illustrated in FIG. 4. While the point-and-shoot button 504 is depicted and described as being positioned on the right side of a touchscreen 122 of a client device 106, the layout of the buttons 118 of the virtual controller 516 are configurable by the player to be displayed at any location on the touchscreen 122.

In an embodiment, the virtual controller 516 is configured with a defined area 506 (referred to subsequently as "view panning area 506") associated with the right side of the touchscreen 122 that allows a player to adjust the direction of an avatar's view 512 of the video game 110 environment based on the player contacting the touchscreen 122 within the view panning area 506. The view panning area 506 is configured such that certain player input provided by touch contacts to the area of the touchscreen display 122 associated with the view panning area 506 serve to move the avatar's view 512 to the position at which the player contacts the touchscreen 122 within the view panning area 506 and to continue panning the avatar's view 512 as the player moves the point of contact within the view panning area 506. Through the use of the view panning area 506, a player can precisely adjust their avatar's view 512 of the video game 110 environment. In order to be conveniently accessed by a player holding the client device 106, the view panning area 506 can be sized and positioned so as to be reachable by a player's thumb while the player's palm and fingers of the same hand are engaged in holding the client device 106.

Figure 6:
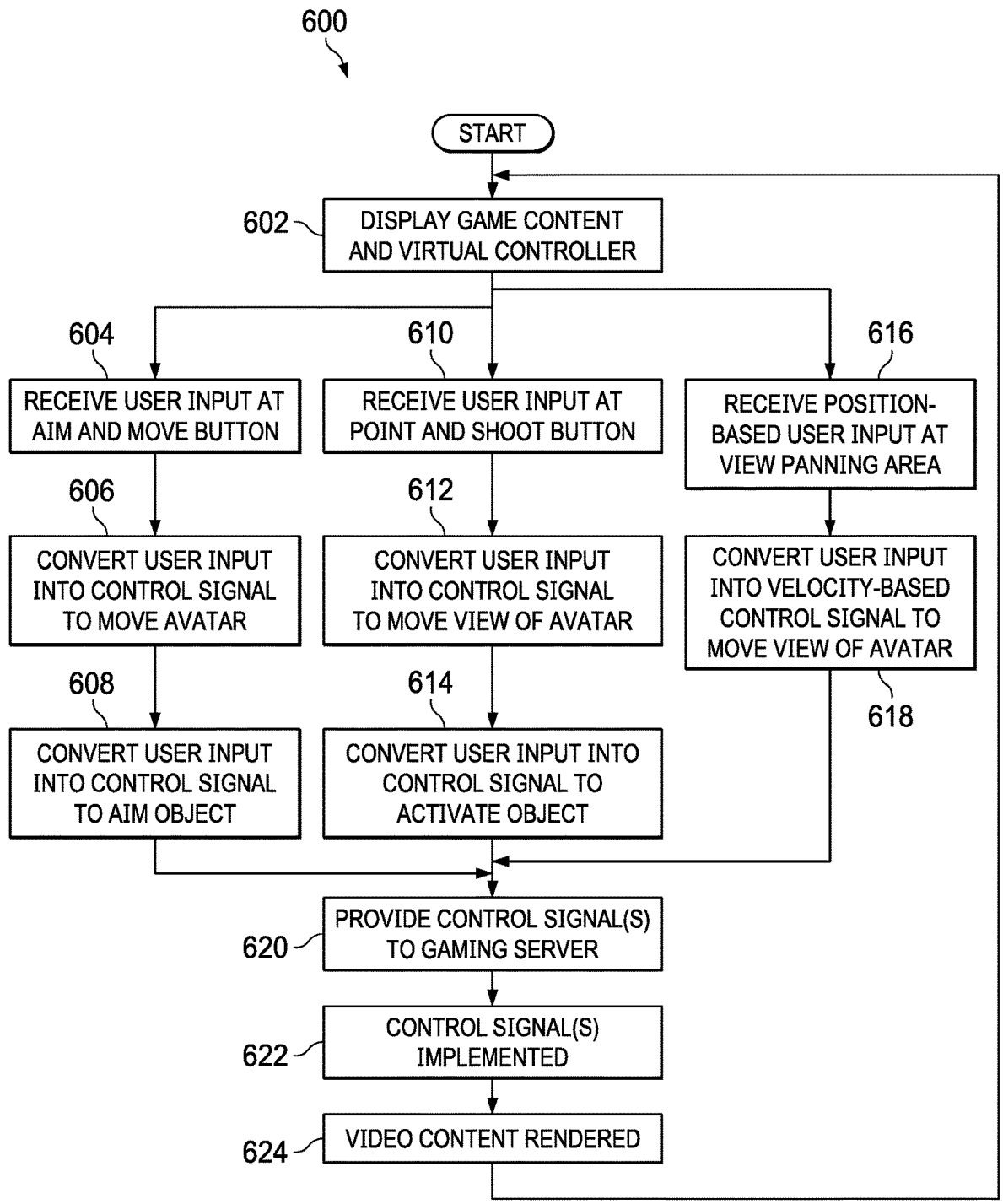
FIG. 6 is a flow diagram illustrating a method for receiving user input at a virtual controller in accordance with some embodiments.

FIG. 6 illustrates a method 600 for controlling gameplay of the video game 110 in the cloud-based gaming system 100 based on player input provided via the virtual game controller 116 displayed at the client device 106 in accordance with some embodiments. Following the initiation of a gaming session by a player, video game content and the virtual game controller 116 are displayed at the client device 106 at block 602. As described above with reference to the embodiment of FIG. 5, the virtual game controller 116 can include, for example, one or more virtual buttons 118, including at least an aim-and-move button 502 disposed at one side (e.g., the left side) of the touchscreen display 122 and a point-and-shoot button 504 disposed at the opposite side (e.g., the right side) of the touchscreen display 122. In an embodiment, the virtual game controller 116 includes a view panning area 506 disposed on the right side of the touchscreen 122.

Player input is received through player interaction with the virtual buttons 118 and the view panning area 506 of the virtual game controller 116 via player contact with associated regions of the touchscreen display 122 as represented by one or more of blocks 604, 610, and 616. For example, the player can manipulate the aim-and-move button 502 and the point-and-shoot button 504 by contacting the area of the touchscreen display 122 associated with each of the buttons 502, 504 and, while maintaining contact with the touchscreen display 122, moving the buttons 502, 504 within an area of the touchscreen display 122 reachable by the player's thumb while the player's palm and fingers are engaged in holding the client device 106. Similarly, the player can direct the video game 110 to change the direction of the avatar's gaze by contacting the portion of the touchscreen 122 associated with the view panning area 506 and, while continuing to make contact with the touchscreen 122, moving the point of contact within the view panning area 506.

The received player input is then converted into control signals that are transmitted for receipt by the gaming server 104 to be provided to the video game 110 as part of the player input stream 120 and which are then interpretable by the video game 110 as instructions to perform actions in the video game 110. For example, positional information regarding a player's movement of a touchpoint associated with a virtual buttons 118 of the virtual game controller 116 is converted into the control signals that are provided to the video game 110 to be interpreted as instructions to implement certain activities in the video game 110. In an embodiment, at block 606, player input received via player manipulation of the aim-and-move button 502 is converted into a control signal interpretable by the video game 110 as an instruction to move the player's avatar 126 within the video game 110 environment based on the direction and distance the player moves the aim-and-move button 502. The player input received via the aim-and-move button 502 is also converted, at block 608, into a control signal interpretable by the video game as an instruction to aim an object within the avatar's control.

In an embodiment, player input received via player manipulation of the point-and-shoot button 504 is converted, at block 612, into a control signal interpretable by the video game 110 as an instruction to change the direction of the avatar's 126 gaze as though the avatar were moving its head or eyes to view different portions of the video game 110 environment based on the direction and distance the player moves the point-and-shoot button 504. The player input received via the point-and-shoot button 504 is also converted, at block 614, into a control signal interpretable by the video game 110 as an instruction to activate an object, or to discharge a weapon, within the avatar's control and to continue to do so until the player releases the point-and-shoot button 504.

In an embodiment, player input received via player contact within the view panning area 506 is converted, at block 618, into a control signal interpretable by the video game 110 as an instruction to change the direction of the avatar's 126 gaze based on the position at which contact within the view panning area 506 is initiated and the position at which contact is broken.

At block 620, control signals generated based on the player input received through the virtual game controller 116 are provided to the gaming server 104 via the player input stream 120. The video game 110 interprets the provided control signals at block 622. The gaming server 104 as controlled by the video game 110 then renders video content based on the implemented control signals and provides the video content for display at the client device 106 at block 624.

Figure 7:
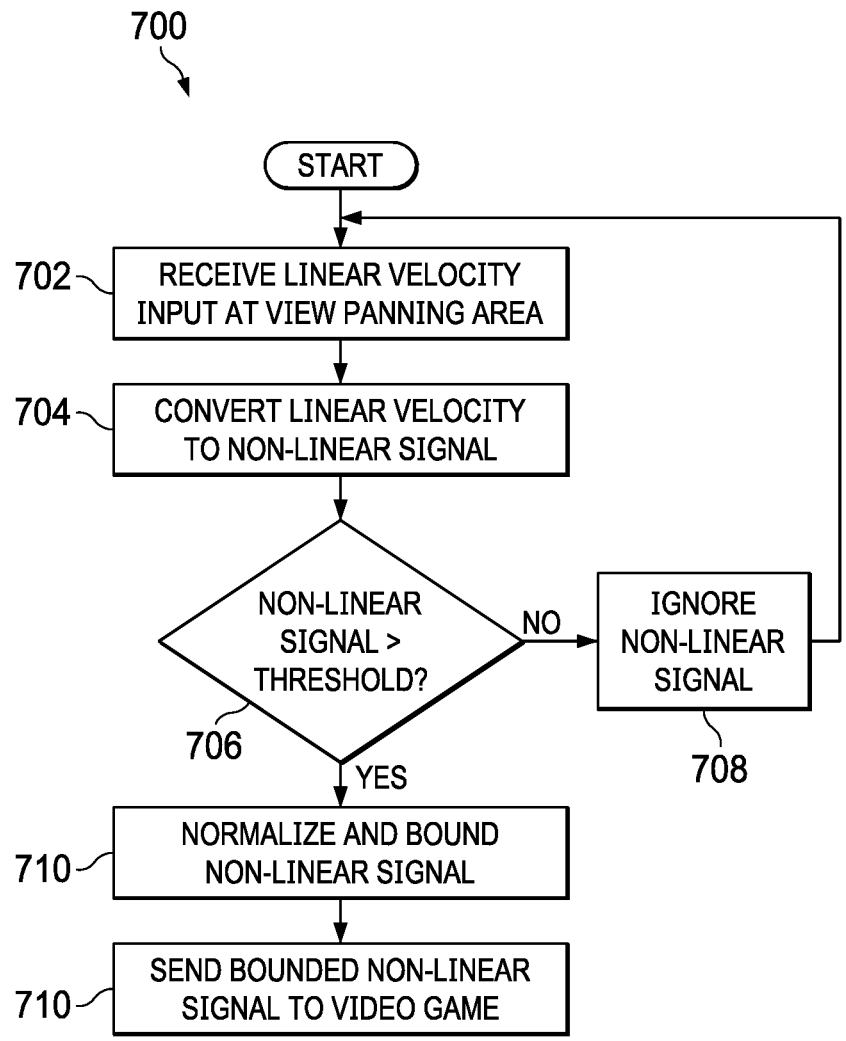
FIG. 7 is a flow diagram illustrating a method to convert user input received at the view panning area into control signals to be interpreted by the video game to adjust the gaze of the player's avatar in accordance with some embodiments.

FIG. 7 is a flow diagram illustrating a method 700 to convert player input received at the view panning area, as shown in block 618 of FIG. 6, into control signals to be interpreted by the video game 110 to adjust the gaze of the player's avatar 126. The view panning area 506 is configured to emulate the function of a right stick of a physical game controller such that quickly moving the point of contact within the view panning area 506 results in a control signal interpretable by the video game 110 as though a right stick of a physical controller is moved to a position that is far from the default centered position. The resulting action within the video game 110 is that the avatar's gaze pans quickly in the direction of movement made by the player within the view panning area 506. Similarly, slowly moving the point of contact within the view panning area 506 results in a control signal interpretable by the video game 110 as though a right stick of a physical controller is moved to a position that is near to the default centered position and, thus, the avatar's gaze pans slowly in the direction of movement made by the player within the view panning area 506.

Generating control signals that are interpretable by the video game 110 as movement of a right stick of a physical game controller is accomplished through the use of a heuristic function to convert the linear velocity of movement of the point of contact within the view panning area 506 into non-linear signals that closely match the signals that a video game 110 would receive from the right stick of a physical game controller. Thus, at block 702, player input in the form of linear velocity is received at the view panning area 506 by a player moving a point of contact within the view panning area 506 at a velocity and in a desired direction. At block 704, the heuristic function is applied to the velocity input received at the view panning area 506 in order to convert the linear velocity input into a non-linear signal. If the converted signal is smaller than a defined threshold value, as shown by block 706, the converted signal is ignored by (that is, not acted upon by) the virtual game controller 116 and no control signal is sent to the video game 110 at block 708. If the converted signal is equal to or greater than the threshold value, the converted signal is normalized and bounded to a value within a range of signal values (that is, a signal range) that would be outputted by the right stick of a physical game controller at block 710. The normalized and bounded control signal is then sent to the video game 110 to be interpreted as an instruction to move the view of the player's avatar 126 at block 712.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
displaying, on a touchscreen display of a mobile device, a virtual game controller comprising a view panning area configured to provide player control of a gaze of an avatar representing a player within a video game executed at a remote gaming server;
receiving, through the touchscreen display, a player interaction with the view panning area via touch contact of the touchscreen display as a linear velocity input;
generating a control signal based on the received player interaction by applying a heuristic function to the linear velocity input to generate a non-linear signal, wherein the control signal is configured to be interpreted by the video game as an instruction to adjust the gaze of the avatar in the video game; and
transmitting the control signal from the mobile device for receipt by the remote gaming server.

2. The method of claim 1, wherein the linear velocity input is based on a direction and distance of movement of the touch contact within the view panning area.

3. The method of claim 1, wherein generating the control signal further comprises:
determining whether the non-linear signal is greater than or equal to a threshold value.

4. The method of claim 3, wherein generating the control signal further comprises:
in response to the non-linear signal being greater than or equal to the threshold value, normalizing and bounding the non-linear signal within a signal range corresponding to a signal range of a physical game controller stick output.

5. The method of claim 3, wherein generating the control signal further comprises:
in response to the non-linear signal being less than the threshold value, ignoring the non-linear signal.

6. The method of claim 1, wherein generating the control signal further comprises:
generating the control signal based upon a first position of an initial contact with the view panning area and a second position of the view panning area at which contact with the view panning area is broken.

7. A device comprising:
a touchscreen display configured to display content from a gaming server and to receive player input as a linear velocity input through touch contact with the touchscreen display;
a network interface configured to communicate with the gaming server executing a video game in which a player is represented by an avatar; and
at least one processing unit configured to:
   display, at the touchscreen display, a virtual game controller including a view panning area configured to provide control of a view of the avatar of a video game environment based on the player input with a region of the touchscreen display associated with the view panning area; and
   generate a control signal based on the player input with the view panning area by applying a heuristic function to the linear velocity input to generate a non-linear signal, wherein the control signal is configured to be interpreted by the video game as an instruction to adjust the view of the avatar of the video game environment.

8. The device of claim 7, wherein the at least one processing unit is further configured to generate the control signal by:
determining whether the non-linear signal is greater than or equal to a threshold value.

9. The device of claim 8, wherein the at least one processing unit is further configured to generate the control signal by:
in response to the non-linear signal being greater than or equal to the threshold value, normalizing and bounding the non-linear signal within a signal range corresponding to a signal range of a physical game controller stick output.

10. The device of claim 8, wherein the at least one processing unit is further configured to generate the control signal by:
in response to the non-linear signal being less than the threshold value, ignoring the non-linear signal.

11. The device of claim 7, wherein the at least one processing unit is further configured to generate the control signal by:
generating the control signal based upon a first position of an initial contact with the view panning area and a second position of the view panning area at which contact with the view panning area is broken.

12. A method comprising:
displaying, on a touchscreen display of a mobile device, a virtual game controller comprising a view panning area configured to provide player control of a direction of a gaze of an avatar representing a player within a video game executed at a remote gaming server;
receiving, through the touchscreen display, an interaction with the view panning area including an initial contact at a first position of the view panning area, a breaking of contact at a second position of the view panning area, and a linear velocity input;
generating a control signal based on the initial contact at the first position of the view panning area and the breaking of contact at the second position of the view panning area, wherein generating the control signal includes applying a heuristic function to the linear velocity input to generate a non-linear signal and wherein the control signal is configured to be interpreted by the video game as an instruction to change the direction of the gaze of the avatar in the video game; and
transmitting the control signal from the mobile device for receipt by the remote gaming server.

13. The method of claim 12, wherein the linear velocity input is based on the initial contact at the first position of the view panning area and the breaking of contact at the second position of the view panning area.

14. The method of claim 12, wherein generating the control signal further comprises:
determining whether the non-linear signal is greater than or equal to a threshold value.

15. The method of claim 14, wherein generating the control signal further comprises:
in response to the non-linear signal being greater than or equal to the threshold value, normalizing and bounding the non-linear signal within a signal range corresponding to a signal range of a physical game controller stick output.

16. The method of claim 14, wherein generating the control signal further comprises:
in response to the non-linear signal being less than the threshold value, ignoring the non-linear signal.

* * * * *